May 6, 1969  K. H. DORE  3,442,040
ANIMATED FIGURE
Filed Sept. 1, 1966  Sheet 1 of 3

Inventor
Karl H. Dore
By Cushman, Darby & Cushman
Attorneys

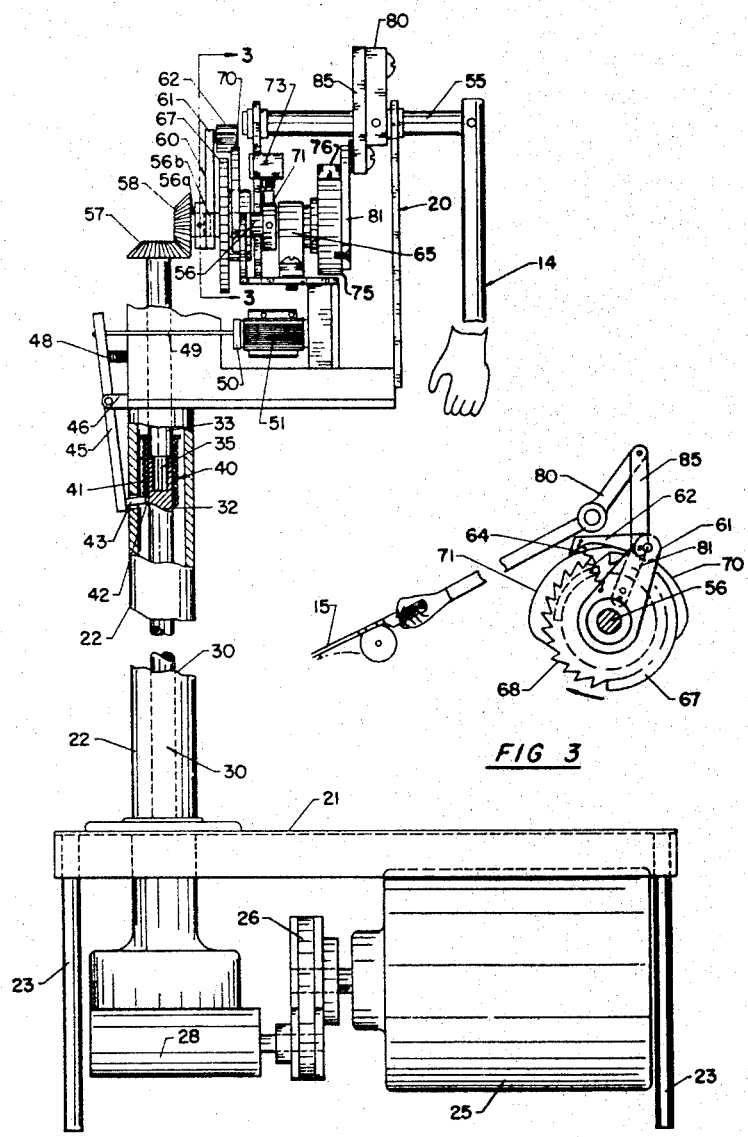

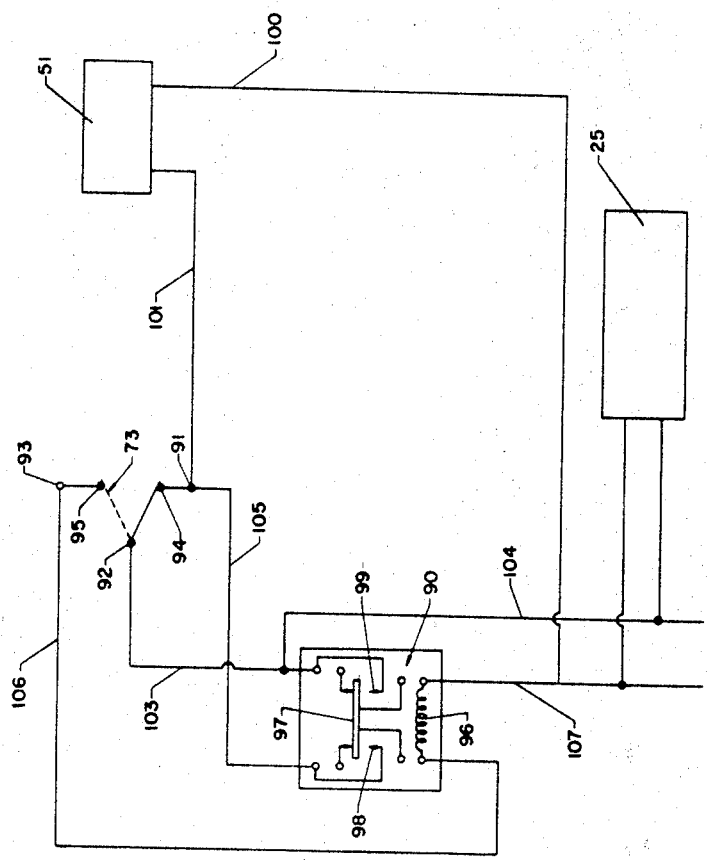

United States Patent Office 3,442,040
Patented May 6, 1969

3,442,040
ANIMATED FIGURE
Karl H. Dore, 361 Queen St., Fredericton,
New Brunswick, Canada
Filed Sept. 1, 1966, Ser. No. 576,692
Int. Cl. G09f *19/08;* A63h *13/04, 33/26*
U.S. Cl. 40—106.35                5 Claims

ABSTRACT OF THE DISCLOSURE

An animated figure having a stationary body and an arm to which a fly rod or the like is secured, such arm being swingable from a horizontal position to a substantially vertical position, is described. The device includes a mechanism for actuating the arm so as to simulate the actions of an angler using fly casting equipment. The mechanism includes means for delaying the turn of the arm to the horizontal position to allow the fly line to move into what is known as the "back cast" position. The mechanism also includes means to cause intermittent operation of the arm whereby the arm will remain in the horizontal position for a short period of time to simulate fishing between successive casts.

---

Figure 1:
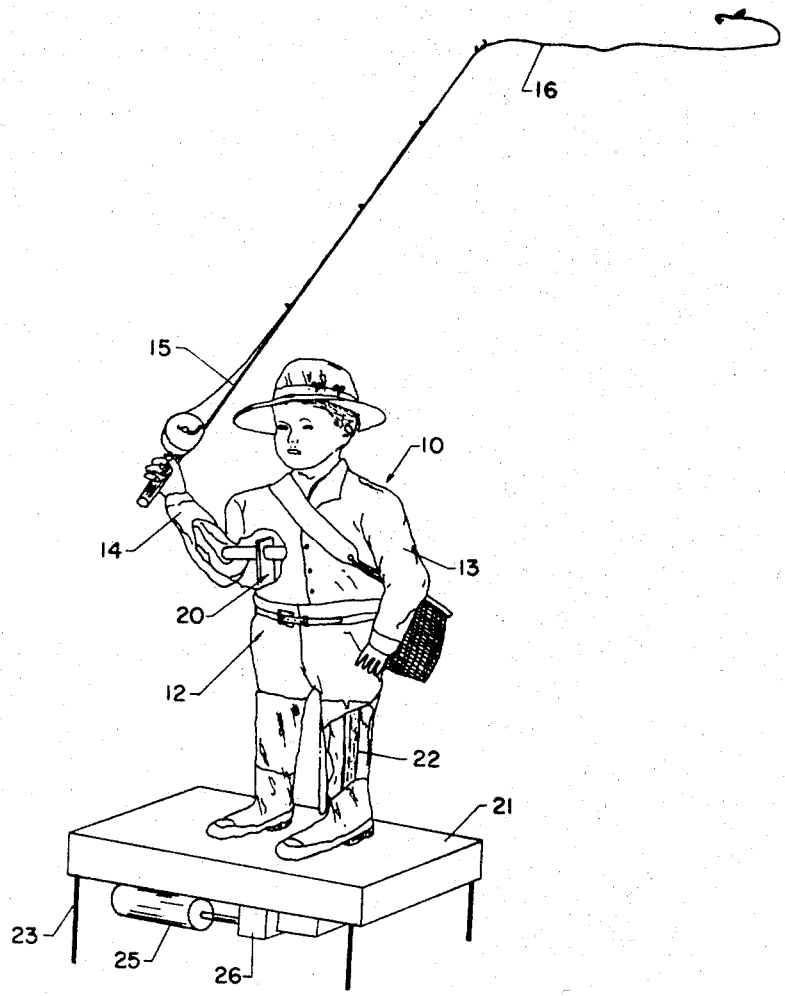

This invention relates to animated figures and more particularly to a mechanical figure adapted to manipulate a fly casting rod, so as to simulate the actions of an angler using fly casting equipment.

The animated figure of this invention is intended for use as an attraction at exhibitions of sporting equipment, and the display in which it is used may include a small pond of water on which the fly line and artificial fly will land.

It is an object of this invention to provide an animated figure having a stationary body and an arm to which a fly rod is secured and which is swingable from a horizontal position to a substantially vertical position.

It is a further object of this invention to provide means for delaying the return of the arm to the horizontal position to allow the fly line to move into what is known as the "back cast" position.

A still further object of this invention is the provision of means to cause intermittent operation of the figure whereby the arm will remain in the horizontal position for a short period of time to simulate fishing between casts.

Accordingly the present invention provides an operating mechanism for use in an animated figure having a body and a swingable arm, said mechanism comprising a frame in said body, a first shaft journalled for rotation on said frame, said swingable arm being secured to said first shaft for rotation therewith, a second shaft parallel to said first shaft drive means connected to one end of said second shaft, means for interrupting the rotary motion of said second shaft, a first crank arm secured to said first shaft, a second crank arm secured to said second shaft and a link member interconnecting said first and second crank whereby on rotation of said second shaft intermittent oscillating motion will be imparted to said first shaft and said arm through said second crank, said link member and said first crank.

In the drawings which illustrate an embodiment of the invention:

FIG. 1 is a perspective view of the animated figure partly broken away;
FIG. 2 is a rear elevational view of the operating mechanism;
FIG. 3 is a section taken along 3—3 of FIG. 2; and
FIG. 4 is a schematic of the electrical circuits of the operating mechanism.

Referring now in detail to the drawings, an animated figure indicated generally at 10 in FIG. 1 includes a hollow body or torso 12, a pair of arms 13 and 14. The arm 13 is stationary whereas the arm 14 is swingable and is provided with a hand shaped to grip a fly rod 15 which is secured thereto. The rod 15 is provided with a fly line 16.

Movement of the arm 14 is provided for by an operating mechanism indicated generally at 20. The mechanism 20 includes a base 21 on which the figure 10 stands. A vertically disposed tubular frame member 22 secured to the base 21 is provided within the body 12. The base 21 is elevated on legs 23 so that an electric motor 25 and suitable reduction gears 26 can be mounted thereunder. As shown in FIG. 2 the reduction gears 26 are connected to a further gear box 28 and a vertical drive shaft 30 extends from the gear box 28 through the base 21 into the tubular frame member 22.

The drive shaft 30 comprises a lower portion 32 and an upper portion 33 interfitted at 35 for aligned axial rotation and adapted to be interconnected by a clutch 40. The clutch 40 is a conventional type which includes a helical spring 41 adapted to receive the mating ends of the shaft portions 32 and 33 therein. A free end 42 of the helical spring 41 is adapted to be engaged by a pin 43 carried by a clutch operating lever 45. The pin 43 extends through a suitable aperture in the tubular frame member 22.

The clutch lever 45 is pivotally secured to a projection 46 on the frame member 22 so that the projection 46 forms a fulcrum for the lever 45. A helical spring 48 biases the lever 45 to a position where the pin 43 engages the end 42 of the clutch spring 41. A flexible member 49 interconnects the other end of the lever with a core 50 of a solenoid 51.

A frame work is secured to an upper end of the tubular frame member 22 rotatably to support a first crank shaft 55 to which the arm 14 is fixedly secured and a second shaft 56 which is operatively connected to the drive shaft 30 through crown gears 57 and 58 and ratchet means 60.

The shaft 56 is in two sections 56a and 56b. The shaft section 56a rotates with the crown gear 58 and has an arm 61 secured thereto. A pawl 62 of the ratchet means 60 is pivotally secured to the outer end of the arm 61 and is biased toward shaft 56 by a spring 64.

The other section 56b of the shaft 56 is journaled in a bearing block 65 and carries a ratchet wheel 67 of the ratchet means 60 so that engagement of the pawl 62 in teeth 68 provided on the wheel 67 (see FIG. 3) causes rotation of the section 56b of the shaft 56.

The ratchet means 60 also includes a semiannular cam 70 so positioned with respect to the ratchet wheel 67 and the pawl 62 that the pawl rides on the cam 70 during approximately half of each revolution of the pawl 62 whereby engagement of the pawl 62 with the teeth 68 is prevented during this portion of each revolution of the pawl 62.

The shaft section 56b also carries a switch cam 71 adapted to engage a plunger of a switch 73 the operation of which will be described in detail below with reference to FIG. 4.

The end of shaft section 56b remote from the ratchet means 60 carries a disc 75 fixedly secured thereto. A brake shoe 76 biased toward the disc 75 by a helical spring (not shown) provides sufficient friction to prevent free rotation of the shaft 56b when no rotational force is provided from the shaft section 56a through the ratchet means 60.

Interconnection of the first shaft 55 and the second shaft 56 is provided by a first crank arm 80 secured to the first shaft 55, a second crank arm 81 secured to the disc 75 carried by the second shaft 56 and a link member 85 having its ends pivotally secured to the free ends of the first crank 80 and the second crank 81.

Referring now to FIG. 4 the electrical controls of the mechanism 20 include the solenoid 51, the switch 73 and a time delay relay 90.

The solenoid 51 is of conventional design and the core 50 is adapted to move into the solenoid when energized. The switch 73 is of the type known as a single pole double throw switch having terminals 91, 92 and 93 and contacts 94 and 95. The time delay relay 90 is preferably a conventional pneumatically timed solenoid operated relay adapted to close a circuit after a predetermined delay. The relay 90 includes a solenoid 96 and a double pole double throw switch 97 having contacts 98 and 99. The solenoid 51 is electrically connected by a conductor 100 to a suitable source of electrical current and to the terminal 91 of the switch 73 by a conductor 101.

The terminal 92 of the switch 73 is electrically connected to the contact 99 of the switch 97 of the time delay relay 90 by a conductor 103 which is in turn connected to the other side of the source of electrical current by a conductor 104. The terminal 91 of the switch 73 is electrically connected by a conductor 105 to another terminal of the switch 97 which is in turn connected to the contact 98. A further electrical conductor 106 interconnects the terminal 93 of the switch 73 and a terminal of the solenoid 96. The other terminal of the solenoid 96 is connected by a conductor 107 to the source of electrical current.

The motor 25 is adapted to run constantly while the animated figure 10 is in operation and is also electrically connected to the current supply.

Assuming all electrical connections have been properly made and the electric motor and control circuit connected to a suitable source of power, the operation of the animated figure will now be described. The motor 25 provides constant rotary motion which is reduced to a suitable speed by reduction gears 26 and transmitted to the shaft 30 through the gear box 28. Rotary motion of the portion 32 of the shaft 30 is transmitted to the shaft portion 33 when the clutch 40 is engaged.

The clutch 40 is engaged when no pressure is exerted by the pin 43 on the free end 42 of the spring 41 and thus the spring 41 frictionally engages the shaft portion 32 in the well known manner. In order for the operating lever 45 to be moved against the force exerted by the spring 48 to a position wherein the pin does not engage the spring 41, it is necessary for the solenoid 51 to be energized so that movement of the core 50 will be transmitted through the flexible interconnecting member 49 to the control lever 48.

When the solenoid 51 is energized by current flowing through the contact 94 of the normally closed switch 73 the clutch 40 is engaged and rotary motion applied to the shaft portion 33 is transmitted through the crown gears 57 and 58 to section 56a of the shaft 56. The pawl 62 carried by the arm 61 rotates with the shaft 56a and engages the teeth 68 of the ratchet wheel 67 during a portion of each rotation so as to cause intermittent partial rotation of the shaft section 56b.

It will be understood that because the pawl 62 rides on the cam 70 during approximately half of each revolution, the pawl completes two revolutions while the ratchet wheel 67 completes only one revolution.

As the section 56b of the second shaft 56 rotates oscillating motion is imparted to the first shaft 55 by the first and second cranks 80 and 81 and the interconnecting link 85. The arm 14 to which the fly rod 15 is secured is thus moved from a substantially horizontal position to substantially vertical position by the first rotation of the pawl 62, a short pause is then provided as the pawl rides on the cam 70 and the arm returns to the horizontal position. During this short pause in the vertical position the fly line 16, secured to the fly rod 15, moves to its full extent in the direction of travel so as to take up the position popularly called the back cast.

In order to provide an inactive period of time between casts to simulate fishing the time delay relay 90 and associated electrical controls have been provided. As the animated figure 10 completes the cast, i.e., the arm 14 returns to the horizontal position and thus the switch cam 71 engages the plunger of the switch 73 moving it to the position represented by the broken line in FIG. 4. In this position the current which would otherwise be provided to the solenoid 51 through contact 94 is switched through the time delay relay 90. The solenoid 51 is thus deenergized and the clutch operating lever 45 therewith moves under the influence of the spring 48 so that the pin 43 engages the free end 42 of the clutch spring 41. The clutch 40 on being disengaged in this manner, allows the shaft portion 32 to rotate freely and no rotational force is applied to the shaft portion 33.

The time delay relay 90 need not be described in detail as it is of conventional design. It is sufficient to indicate that when energized, a time delay is provided before the contacts 98 and 99 of the switch 97 are close to allow current to flow through the conductor 104, the switch 97, the conductors 105 and 101 to the solenoid 51.

As soon as the solenoid 51 is energized the clutch 40 is engaged, the shaft 33 and 56 rotate, and the switch cam 71 moves to a position where it no longer engages the plunger of the switch 73. In which case the switch 73 returns to the normally closed position shown in FIGURE 4 and a new operating cycle is started.

I claim:

1. An operating mechanism for use in an animated figure having a body and a swingable arm, said mechanism comprising; a frame, a first shaft journalled for rotation on said frame, said swingable arm being secured to said first shaft for rotation therewith, a second shaft means associated with said first shaft, said second shaft means having first and second portions, drive means connected to effect rotation of the first portion of said second shaft means, a clutch means interposed between said drive means and the first portion of said second shaft means, a pawl and ratchet means including a ratchet wheel interposed between the first and second portions of said second shaft means, a first crank secured to said first shaft, a second crank secured to the second portion of said second shaft means, a link member operatively interconnecting said first and second crank, whereby on engagement of said clutch means said ratchet wheel will be rotated with said pawl engaging said ratchet wheel to cause the second portion of said second shaft means together with said second crank to rotate thereby oscillating said first crank and rocking said first shaft to swing said arm.

2. An animated figure as claimed in claim 1 wherein said ratchet means includes means for preventing engagement of said pawl with said ratchet wheel during a portion of each revolution of the first portion of the second shaft means.

3. An animated figure as claimed in claim 2 further comprising a solenoid connected to actuate said clutch means, and cyclically actuated means connected to said solenoid to effect cyclic engagement and disengagement of said clutch means.

4. An animated figure as claimed in claim 3 wherein said cyclically actuated means includes a cam connected to one of said shafts, an electrical circuit adapted to supply energy to said solenoid, and switch means associated with said cam to open and close said electrical circuit to energize and deenergize the solenoid upon rotation of said one of said shafts.

5. An animated figure as claimed in claim 4 further comprising a time delay relay connected in said electrical circuit adapted to effect a delay between the time said switch is closed by said cam and the time said solenoid is energized to effect engagement of said clutch means.

References Cited
UNITED STATES PATENTS

| | | | |
|---|---|---|---|
| 974,450 | 11/1910 | Tully | 40—106.35 X |
| 1,631,451 | 6/1927 | Ankeny | 46—119 |
| 2,296,541 | 9/1942 | Schuyler | 40—106.35 X |
| 3,159,935 | 12/1964 | Rubens | 40—106.31 |

EUGENE R. CAPOZIO, *Primary Examiner.*

R. CARTER, *Assistant Examiner.*

U.S. Cl. X.R.

46—145, 245